March 5, 1968 R. E. SWARTS ET AL 3,371,542
GYRO VERTICAL ERECTING MEANS
Filed Feb. 11, 1965 2 Sheets-Sheet 2

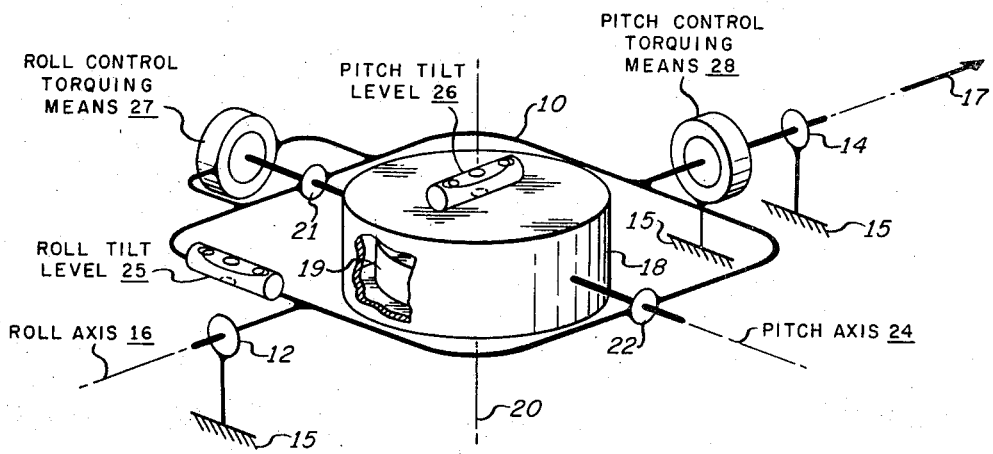

INVENTORS
RICHARD E. SWARTS
BERT V. TIBLIN
BY Arthur H. Serrell
ATTORNEY weiter # United States Patent Office 3,371,542
Patented Mar. 5, 1968

3,371,542
GYRO VERTICAL ERECTING MEANS
Richard E. Swarts, Northport, and Bert V. Tiblin, Huntington, N.Y., assignors to Sperry Rand Corporation, Great Neck, N.Y., a corporation of New York
Filed Feb. 11, 1965, Ser. No. 431,811
12 Claims. (Cl. 74—5.47)

This invention relates to gyro verticals with erecting means that include reference levels that are subject to error when influenced by changes in the speed of a craft along its fore and aft axis or when influenced by centripetal acceleration during craft turns. More particularly, such levels include an electrolytic conductor, a gravity responsive bubble and a pair of electrodes wetted differentially by the conductor that are arranged to sense tilt about each of the mutually perpendicular, normally horizontal axes of the rotor frame of the gyro vertical through a determined range of angular tilt. In the improved vertical, the wetted differential electrodes of the levels are bypassed at tilts greater than the determined range to prevent erection of the frame to a false vertical when the bubbles are subject to the influence of the velocity and acceleration conditions noted above.

An object of the present invention is to provide an erecting means for a gyro vertical with a tilt sensing means or level that is self monitoring so that it is unnecessary to include cut-off relays in the control circuits.

A feature of the invention resides in the inclusion in the level structure of an electrode that is wetted continuously by the conductor and a normally non-wetted electrode that when wetted by the conductor cooperates with the continuously wetted electrode to bypass the differential control electrodes at a determined angle of tilt that is greater than the determined tilt range of the levels.

Another feature of the invention is provided by a circuit that connects the two levels or tilt sensing means of the improved erecting means in parallel relation to an energizing source.

Figure 3:
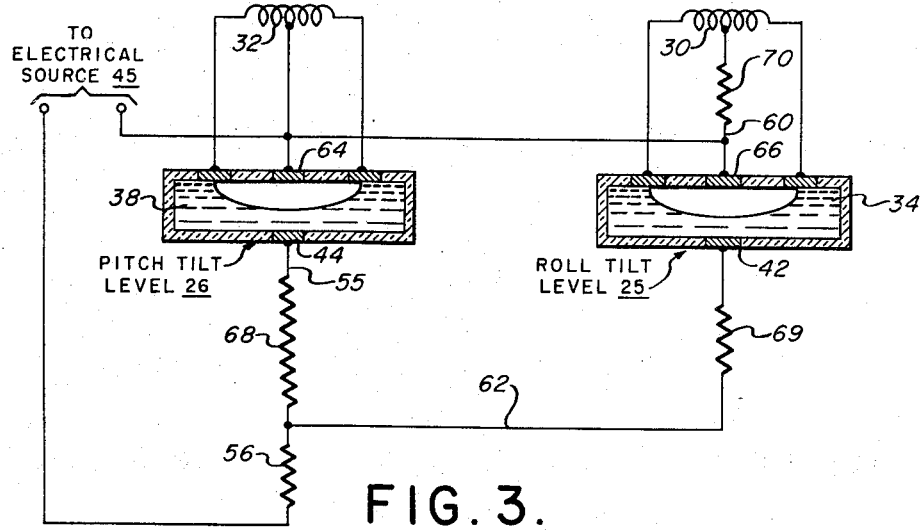
Figure 4:
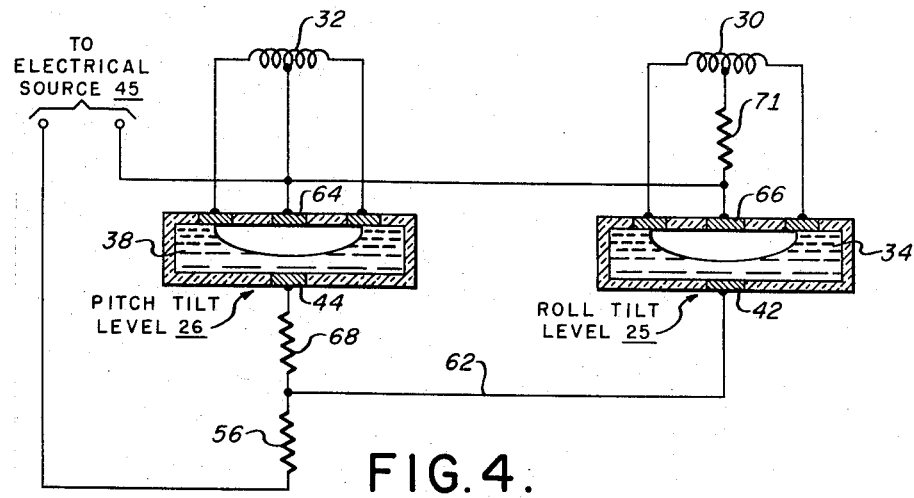
Figure 5:
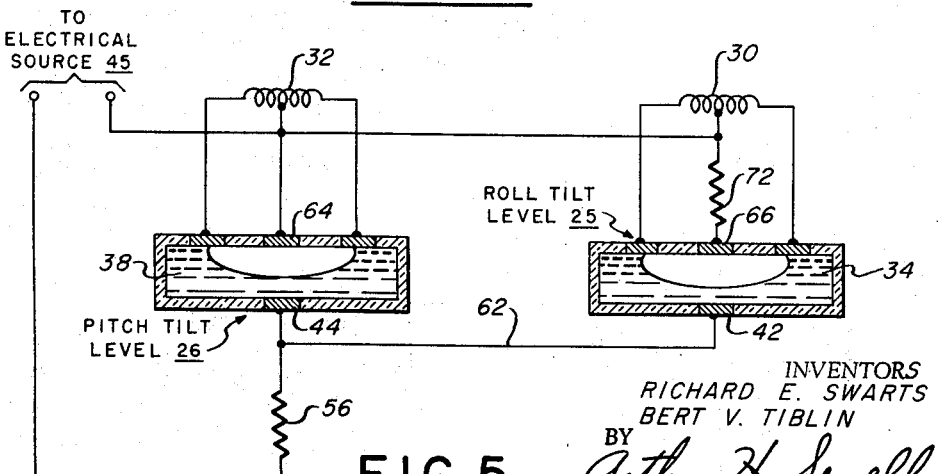

Other objects, features and structural details of the present invention will become apparent in the following detailed description thereof in connection with the accompanying drawings in which:

FIG. 1 is a perspective view of the elements of the improved gyro vertical showing their angular relation to one another and with respect to a dirigible craft, FIG. 2 is a schematic view and wiring diagram in which an electrical source is connected to the respective tilt sensing levels and related torquing means, and FIGS. 3, 4 and 5 are modifications of the circuit diagram shown in FIG. 2.

The elements of the gyro vertical shown in FIG. 1 include a gimbal ring 10 that is mounted by suitable spaced bearings 12, 14 on the relatively fixed frame 15 of a dirigible craft with freedom about an axis 16 that corresponds to the roll axis of the craft. Arrow 17 along the axis 16 represents forward motion of the craft along its fore and aft axes in a horizontal plane. Rotor frame 18 of the gyro vertical suitably supports a gyroscopic rotor 19 that spins about a substantially vertical axis 20. The rotor 19 is preferably driven by a conventional electric motor that is not included in the drawing. Further, as shown in FIG. 1, frame 18 is mounted on ring 10 by suitable spaced bearings 21, 22 with freedom about an axis 24 that corresponds to the pitch axis of the craft. The frame 18 of the conventional structure of the described gyro vertical is mounted on the craft through the ring 10 with freedom about mutually perpendicular, normally horizontal axes 16 and 24 that respectively correspond to the roll and pitch axes of the craft.

Known erection controls for the described type of gyro vertical include a gravity reference in the form of a tilt sensor or level 25 for axis 16. As shown in FIG. 1, level 25 is fixedly mounted on the gimbal 10 to sense tilt of the frame 18 and gimbal 10 with respect to the axis. A second sensor or level 26 is fixedly mounted on the frame 18 to provide an equivalent function with respect to the axis 24. Here, the frame moves in relation to the ring 10. The tilt sensing means or level 25 in both FIGS. 1 and 2 is designated as roll tilt level. Similarly, the tilt sensing means or level 26 in both FIGS. 1 and 2 is designated as pitch tilt level.

The means for controlling the erection of the frame 18 further includes means for exerting a torque about each of the axes 16 and 24. The torquing means or motor at the axis 24 is indicated at 27 in FIGS. 1 and 2. The torquing means or motor at the axis 16 is indicated at 28 in FIGS. 1 and 2. In operation, torque motor 27 is controlled by the output of the roll tilt level 25 and torque motor 28 is controlled by the input of the pitch tilt level 26 to precess the frame 18 so that axis 20 is normally vertical. As shown in FIGS. 1 and 2, the torquing means 27 is a motor having a stator fixedly connected to the ring 10 with a fixed field winding 29 and a control field winding 30. The rotor of motor 27 is a squirrel cage that is mounted in fixed relation to the frame 18. The torquing means 28 is a motor having a stator fixedly connected to the frame 15 of the craft with a fixed field winding 31 and a control field winding 32. Here, the squirrel cage rotor of motor 28 is fixed to the ring 10. Level 25 of the erecting means includes an electrolytic conductor 34, a gravity responsive bubble 35, and a pair of control electrodes 36 and 37 that are wetted differentially by the conductor 34 through a predetermined tilt range. Sensor or level 26 of the combination includes an electrolytic conductor 38, a gravity responsive bubble 39 and like differential control electrodes 40 and 41. The respective levels 25, 26 also include respective electrodes 42, 44 that are continuously wetted by the conductors 34, 38. It will be understood that the conductivity of the sensors depends on the areas of the control electrodes that are wetted by the conductor. Where the tilt angle is null, the areas of the electrodes wetted by the conductor are equal and the level has no output. As tilt occurs, the bubble and conductor move with respect to one another through an angular tilt range determined at one tilt limit when the area of one of the control electrodes is completely wetted and the other electrode is covered by the bubble and at the other tilt limit when the area of the other of the control electrodes is completely wetted and the one electrode is covered by the bubble. The described erecting combination for the pitch axis 24 includes level 26 and torque motor 28 in a circuit that includes an electrical source 45. Here the winding 31 of the stator of motor 28 is energized by the source by way of lead 46, lead 47, winding 31, lead 49, lead 50 and lead 51. The winding 32 of the motor 28 is connected to the source by way of a lead 52 and lead 51 where the winding 32 has a center tap fastening to the lead 52. Further, lead 54 connects one of the ends of the winding 32 to electrode 40 and lead 55 connects the other of the ends of the winding 32 to electrode 41. The pitch erecting circuit is completed by a lead 55 to the electrode 44, a resistor 56 and lead 57. The normally effective erecting combination for the roll axis 16 includes level 25 and torque motor 27 in a circuit parallel to the heretofore described pitch circuit. Here, leads 46 and 50 are connected to the winding 29 of the stator of the torquing motor 27. Lead 58 connects one end of the winding 30 of the motor 27 to electrode 36. Lead 59 connects the other end of the winding 30 to the electrode 37 of the sensing means or tilt level 25. The center tap position of winding 30 includes a lead 60, and a lead 61 connecting with lead 51 to the source. Lead 62 also connects electrode 42 to the lead 55.

Further in accordance with the invention, the level 26 of the erection controlling means includes a normally non-wetted electrode 64 that is wetted by the conductor 38 and cooperates with the continuously wetted electrode 44 to bypass the control electrodes 40 and 41 at a determined angle of tilt of the level greater than the operating range of the electrodes 40 and 41. At this range, lead 65 between electrode 64 and lead 51 closes a circuit that shorts out the motor 28 to prevent the frame 18 from being erected falsely to an out of vertical condition displaced angularly with respect to the pitch level 26 at an angle greater than the determined tilt range. Level 25 of the improved erection controlling means is similarly constructed to include a normally non-wetted electrode 66 that is wetted by the conductor 34 and cooperates with the continuously wetted electrode 42 to bypass the control electrodes 36 and 37 at a determined angle of tilt of the level greater than the operating range of the electrodes 36 and 37. At this range, lead 67 between electrode 66 and lead 61 closes a circuit that shorts out the motor 27 to prevent frame 18 from being erected falsely to an out of vertical condition displaced angularly with respect to the roll level 25 at an angle greater than the determined tilt range. In the normal operating range of the levels 25 and 26, electrodes 66 and 64 are non-wetted and the windings 30 and 32 provide equal impedances in the respective parallel branches of the erecting control means. Where the roll level 25 is subject to centripetal acceleration during craft turns or the pitch level 26 is subject to craft acceleration or deceleration along its fore and aft axis, one of the normally non-wetted electrodes is wetted by the conductor to short the impedance in one of the branches and increase the impedance in the other branch to change its erection characteristics.

Where the craft is an aircraft, it is desirable during turns to cut off roll erection and reduce pitch erection and during fore and aft changes in speed to cut off pitch erection only, the basic circuit shown in FIG. 2 may be modified as shown in FIG. 3 to include a resistor 68 in parallel lead 55 between the continuously wetted electrode 44 of the pitch level 26 and the source 45, a resistor 69 in lead 62 in the roll axis branch between continuously wetted electrode 42 and the source 45 of half the impedance of the resistor 68 and a resistor 70 in the lead 60 between the roll torque motor 27 and source 45 of the same impedance as resistor 69. Here, under normal erecting conditions there is equal impedance in the roll and pitch branches of the circuit and neither of the electrodes 64, 66 is wetted. In turns, the electrode 66 of the roll level 25 is wetted to cut off the roll erection as desired by shorting the motor winding 30 as well as resistor 70 to lower the impedance in the roll branch of the circuit to half of that in the pitch branch and therefore reduce the pitch erection rate in proportion. When the pitch level electrode 64 is wetted due to change in the forward speed of the craft, the pitch motor winding 32 is shorted to cut off the pitch erection only. Here, resistor 68 remains in the pitch circuit to match the impedance of the resistors 69, 70 included in the effective roll circuit.

In the circuit arrangement shown in FIG. 4, resistor 68 is included in the pitch circuit and the matching impedance normally included in the roll circuit is provided by a resistor 71 in lead 60 between the winding 30 of torque motor 27 and source 45. Here, when the roll level is influenced so that the conductor 34 wets the electrode 66, the roll motor 27 is shorted with the resistor 71 to bypass the pitch level 26 and torque motor 28. Under conditions where the pitch level electrode 64 is wetted, the pitch erection is cut off while the roll erection torquing means 27 remains fully effective.

A third impedance variation of the improved erection control means is shown in FIG. 5 where the impedance in the roll circuit is also provided by a resistor 72 in lead 67 between the non-wetted electrode 66 of the roll axis level 25 and the source 45. Here, the pitch erection circuit remains effective when the electrode 66 is wetted. Also, with the impedance of the resistor 72 equal to the impedance of the control field winding 32 of torque motor 27, when electrode 66 is wetted, the impedance in the roll branch is halved by the shorting of winding 30 so that the pitch motor 28 operates at an erection rate that is reduced by half.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a gyro vertical having a rotor frame mounted with freedom about mutually perpendicular, normally horizontal axes; means for controlling the erection of the frame including a torque motor with a control winding for one of the axes, a torque motor with a control winding for the other of the axes; a first level movable about one of the axes having an electrolytic conductor, a gravity responsive bubble, a pair of control electrodes wetted differentially by the conductor through a determined range of angular tilt, a continuously wetted electrode, and a normally non-wetted electrode wetted by the conductor and cooperating with the continuously wetted electrode to bypass the control electrodes at a determined angle of tilt of the first level greater than that of the operating range of the control electrodes; a second level movable about the other of the axes having an electrolytic conductor, a gravity responsive bubble, a pair of control electrodes wetted differentially by the conductor through a determined range of angular tilt, a continuously wetted electrode, and a normally non-wetted electrode wetted by the conductor and cooperating with the continuously wetted electrode to bypass the control electrodes at a determined angle of tilt of the second level greater than that of the operating range of the control electrodes; a source of electrical energy, and a circuit connecting the first and second levels in parallel relation to the source including a lead between the source and the respective continuously wetted electrodes of both levels, a lead connecting the normally non-wetted electrodes of both levels and the windings of both motors to the source, a lead between the related motor winding and one of the control electrodes of the first level, a lead between the related motor winding and the other of the control electrodes of the first level, a lead between the related motor winding and one of the control electrodes of the second level, and a lead between the related motor winding and the other of the control electrodes of the second level.

2. A combination of the character claimed in claim 1, in which the axes of the rotor frame of the gyro vertical correspond to the pitch and roll axes of a dirigible craft, the lead between the continuously wetted electrode of the pitch axis level and the source includes a resistor, the lead between the continuously wetted electrode of the roll axis level and the source includes a resistor of half the impedance of the resistor in the pitch axis lead and the lead between the roll torque motor winding and source includes a resistor of half the impedance of the resistor in the pitch axis lead.

3. A combination of the character claimed in claim 1, in which the axes of the rotor frame of the gyro vertical correspond to the pitch and roll axes of a dirigible craft, and the lead between the non-wetted electrode of the roll axis level and the source includes a resistor.

4. A combination of the character claimed in claim 3 in which the impedance of the resistor in the roll erecting circuit is equal to the impedance of the winding of the roll torque motor.

5. A combination of the character claimed in claim 1, in which the axes of the rotor frame of the gyro vertical correspond to the pitch and roll axis of a dirigible craft, the lead in the circuit between the continuously wetted electrode of the pitch axis level and the source includes a resistor, and the lead between the roll torque motor winding and the source includes a resistor of an impedance equal to the pitch axis resistor.

6. In a gyro vertical having a rotor frame mounted on a craft with freedom about mutually perpendicular, normally horizontal pitch and roll axes; means for controlling the erection of the frame including means for exerting a torque about the pitch axis, means for exerting a torque about the roll axis; means for sensing tilt of the frame about its pitch axis including a level having an electrolytic conductor, a gravity responsive bubble, a pair of control electrodes wetted differentially by the conductor through a determined tilt range, a continuously wetted electrode, and a normally non-wetted electrode for bypassing the control electrodes at a determined angle of tilt of the level greater than the operating range of the control electrodes; means for sensing tilt of the frame about its roll axis including a level having an electrolytic conductor, a gravity responsive bubble, a pair of control electrodes wetted differentially by the conductor through a determined tilt range, a continuously wetted electrode, and a normally non-wetted electrode for bypassing the control electrodes at a determined angle of tilt of the level greater than the operting range of the control electrodes; an electrical source for energizing the torque exerting means, and a circuit connecting the pitch sensing means and the roll sensing means in parallel relation to the source including a lead between the source and the continuously wetted electrodes of the pitch and roll levels, a lead connecting the normally non-wetted electrodes of both levels and the respective torque exerting means to the source, leads between the control electrodes of one of the levels and one of the torque exerting means, and leads between the control electrodes of the other of the levels and the other of the torque exerting means.

7. A combination of the character claimed in claim 6, in which the lead in the circuit betwen the continuously wetted electrode of the pitch axis level and the source includes a resistor, the lead between the continuously wetted electrode of the roll axis level and the source includes a resistor of half the impedance of the resistor in the pitch axis lead, and the lead between the roll torque exerting means and the source includes a resistor of half the impedance of the resistor in the pitch axis lead.

8. A combination of the character claimed in claim 6, in which the lead between the non-wetted electrode of the roll axis level and the source includes a resistor.

9. A combination of the character claimed in claim 8, in which the torque exerting means is a motor with a control winding, and the impedance of the resistor in the roll erecting circuit is equal to the impedance of the motor winding.

10. A combination of the character claimed in claim 6, in which the lead between the continuously wetted electrode of the pitch axis level and the source includes a resistor, and the lead between the roll torque exerting means and source includes a resistor of an impedance equal to the pitch axis resistor.

11. In a gyro vertical having a rotor frame mounted with freedom about mutually perpendicular, normally horizontal tilt and precession axes; means for controlling the erection of the frame including means for exerting a torque about the precession axis including a winding; means for sensing tilt of the frame about its tilt axis including a level having an electrolytic conductor, a gravity responsive bubble, a pair of control electrodes wetted differentially by the conductor through a determined tilt range, a continuously wetted electrode, and a normally non-wetted electrode for bypassing the control electrodes at a determined angle of tilt of the level greater than the operating range of the control electrodes; an electrical source for energizing the torque exerting means, a lead between the source and the wetted electrode of the level, a lead connecting the torque exerting winding and the normally non-wetted electrode to the source, a lead between one of the control electrodes and the winding, and a lead between the other of the control electrodes and the winding.

12. The combination recited in claim 1 further including impedance means connected in at least one of the parallel legs of the circuit, which legs include the normally non-wetted and continuously wetted electrodes of said levels, for regulating the effectiveness of one of said levels when the circuit between the normally non-wetted and continuously wetted electrode of the other level is completed.

No references cited.

FRED C. MATTERN, JR., *Primary Examiner.*

C. J. HUSAR, *Assistant Examiner.*